United States Patent
Girondi

(10) Patent No.: US 11,596,880 B2
(45) Date of Patent: Mar. 7, 2023

(54) FILTER CARTRIDGE

(71) Applicant: UFI FILTERS S.P.A., Mantova (IT)

(72) Inventor: Giorgio Girondi, Mantova (IT)

(73) Assignee: UFI Filters S.P.A., Mantova (IT)

( * ) Notice: Subject to any disclaimer, the term of this patent is extended or adjusted under 35 U.S.C. 154(b) by 76 days.

(21) Appl. No.: 16/629,828

(22) PCT Filed: Jul. 10, 2018

(86) PCT No.: PCT/IB2018/055080
§ 371 (c)(1),
(2) Date: Jan. 9, 2020

(87) PCT Pub. No.: WO2019/012425
PCT Pub. Date: Jan. 17, 2019

(65) Prior Publication Data
US 2021/0138365 A1    May 13, 2021

(30) Foreign Application Priority Data

Jul. 12, 2017  (EP) .................................... 17181050
Jul. 13, 2017  (IT) .................. 102017000078621

(51) Int. Cl.
*B01D 29/21*    (2006.01)
*B01D 35/30*    (2006.01)

(52) U.S. Cl.
CPC ............. *B01D 29/21* (2013.01); *B01D 35/30* (2013.01); *B01D 2201/295* (2013.01);
(Continued)

(58) Field of Classification Search
CPC ................. B01D 35/30; B01D 35/306; B01D 2201/295; B01D 2201/305;
(Continued)

(56) References Cited

U.S. PATENT DOCUMENTS

| 2006/0180539 A1 | 8/2006 | Wolf et al. |
| 2011/0147297 A1* | 6/2011 | Core ....................... B01D 35/30 210/232 |
| 2014/0305858 A1* | 10/2014 | Downs ................... B01D 29/21 210/232 |

FOREIGN PATENT DOCUMENTS

| EP | 2 789 375 A1 | 10/2014 |
| WO | 2010/004315 A2 | 1/2010 |

OTHER PUBLICATIONS

International Search Report and Written Opinion of the International Searching Authority for International Patent Application No. PCT/IB2018/055080 dated Oct. 19, 2018, 10 pages.

* cited by examiner

*Primary Examiner* — Benjamin M Kurtz
(74) *Attorney, Agent, or Firm* — Merchant & Gould P.C.

(57) ABSTRACT

A filter cartridge (1) is for a fluid filtration assembly (10). The filtration assembly (10) includes a bowl body (11) and a head body (12) having respectively a first and second collars (111, 121) to engage each other in rototranslation. The bowl body (11) has a filtration chamber (110) accessible through an access mouth (110') delimited peripherally by the first collar (11) while the head body (12) has in the second collar (121) a slot (125). The filter cartridge (1) is housable in the bowl body (11) having a filter medium (2) and an end plate (3) to engage the first collar (111). The filter cartridge (1) is snap-blockable in the axial direction to the bowl body (11) by an active blocking member (31). The filter cartridge (1) includes an anti-rotation element (32) extending radially from the end plate (3) for being housed in the slot (125).

19 Claims, 9 Drawing Sheets

(52) U.S. Cl.
CPC ............... *B01D 2201/4015* (2013.01); *B01D 2201/4076* (2013.01); *B01D 2201/4084* (2013.01)

(58) Field of Classification Search
CPC ...... B01D 2201/306; B01D 2201/4007; B01D 2201/4015; B01D 2201/4053; B01D 2201/4076; B01D 2201/4061
See application file for complete search history.

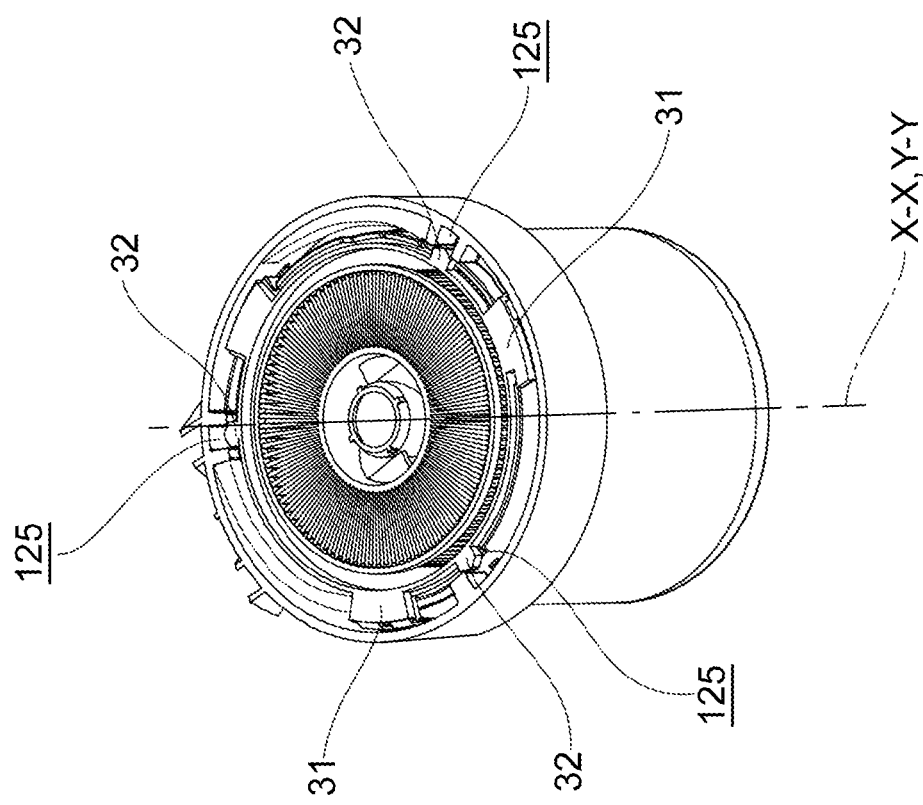
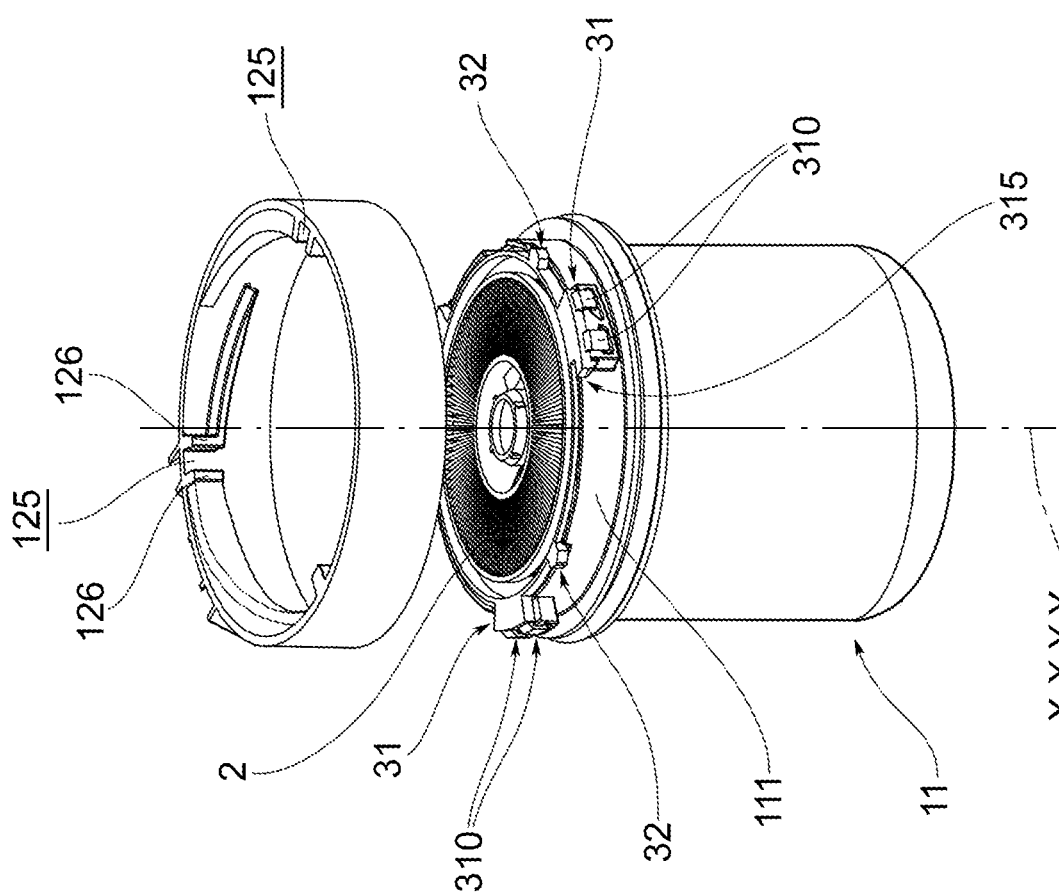

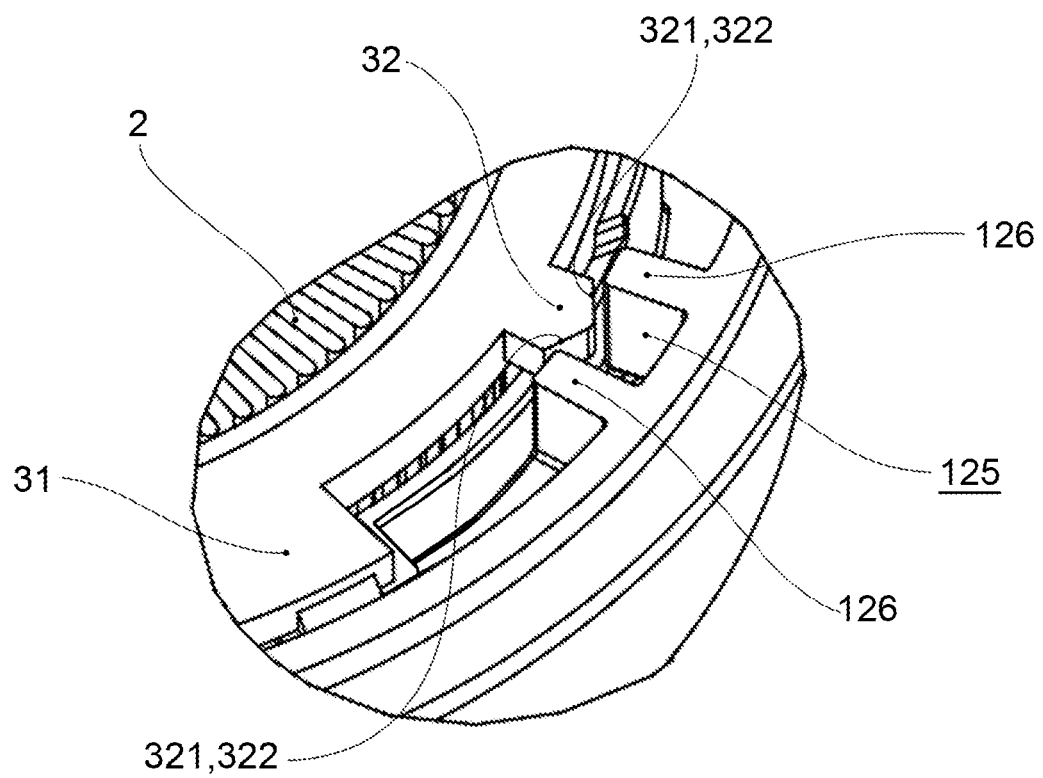
FIG.6'
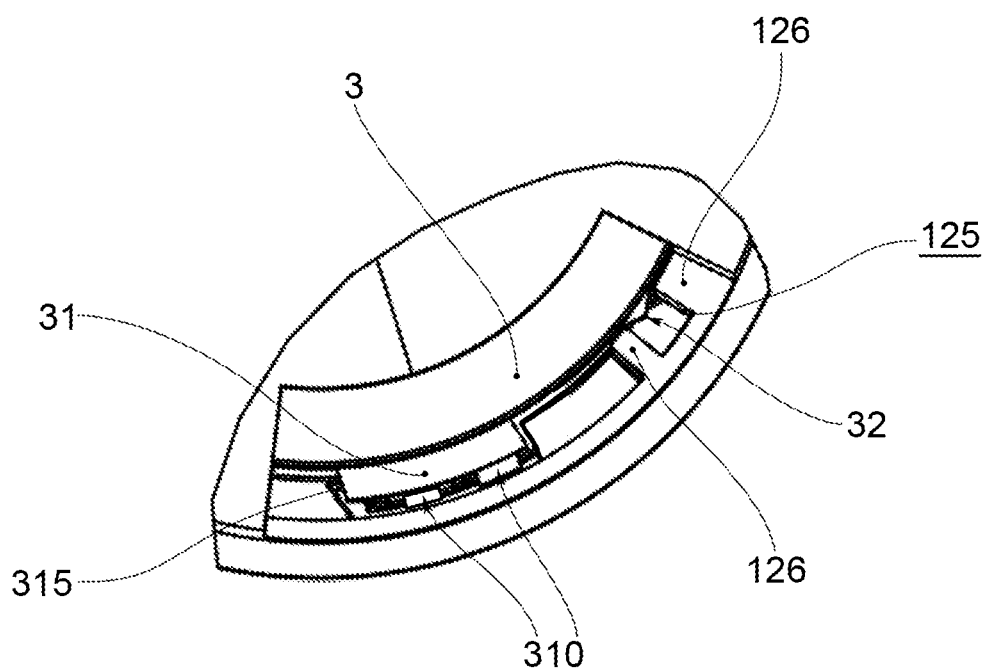
FIG.6"

FILTER CARTRIDGE

This application is a National Stage Application of PCT/IB2018/055080, filed 10 Jul. 2018, which claims benefit of European Patent Application Serial No. 17181050.0, filed 12 Jul. 2017 and Italian Patent Application Serial No. 102017000078621, filed 13 Jul. 2017 and which applications are incorporated herein by reference. To the extent appropriate, a claim of priority is made to each of the above-disclosed applications.

FIELD OF APPLICATION

The present invention relates to a filter cartridge of a fluid filtration assembly. In addition, the present invention also relates to said fluid filtration assembly which comprises the filter cartridge. In addition, the present invention relates to the assembly method of said assembly.

The present invention has its preferred application in the automotive field. Specifically, the context which the present invention lies in is that of fluid filtration assemblies, particularly vehicle fuel, preferably diesel.

Filtration assemblies comprising a bowl body (or tub) and a head body (or head) mutually engaged in an integral manner are typically known of in the prior art. The bowl body and the head body are specially shaped to house within them a filter cartridge. The bowl body and head body are specifically suitable to be fluidically connected to the fuel circulation system. As a result, fuel to be filtered (dirty) enters the fluid filtration assembly and after passing through the filter cartridge, filtered fuel (clean) comes out.

The main drawback of the prior filtration assemblies is that of presenting complex engagement methods between the various aforementioned components.

In the presence of complex engagement methods between the various components, the assembly, and similarly the disassembly operations of the fluid filtration assembly are particularly complex. This drawback is therefore strongly felt, negatively affecting the maintenance operations of the filtration assembly and in particular the replacement of the filter cartridge.

SOLUTION ACCORDING TO THE INVENTION

The need is therefore strongly felt to provide a filter cartridge of a filtration assembly and a fluid filtration assembly comprising such filter cartridge that overcome such drawback so as to permit simple maintenance operations to be carried out.

The purpose of the present invention is to provide a filter cartridge and filtration assembly which provide for a simple method of engagement between the various components and require simple assembly and disassembly operations.

DESCRIPTION OF THE DRAWINGS

Further characteristics and advantages of the invention will, in any case, be evident from the description given below of its preferred embodiments, made by way of a non-limiting example with reference to the appended drawings, wherein.

Figure 1:
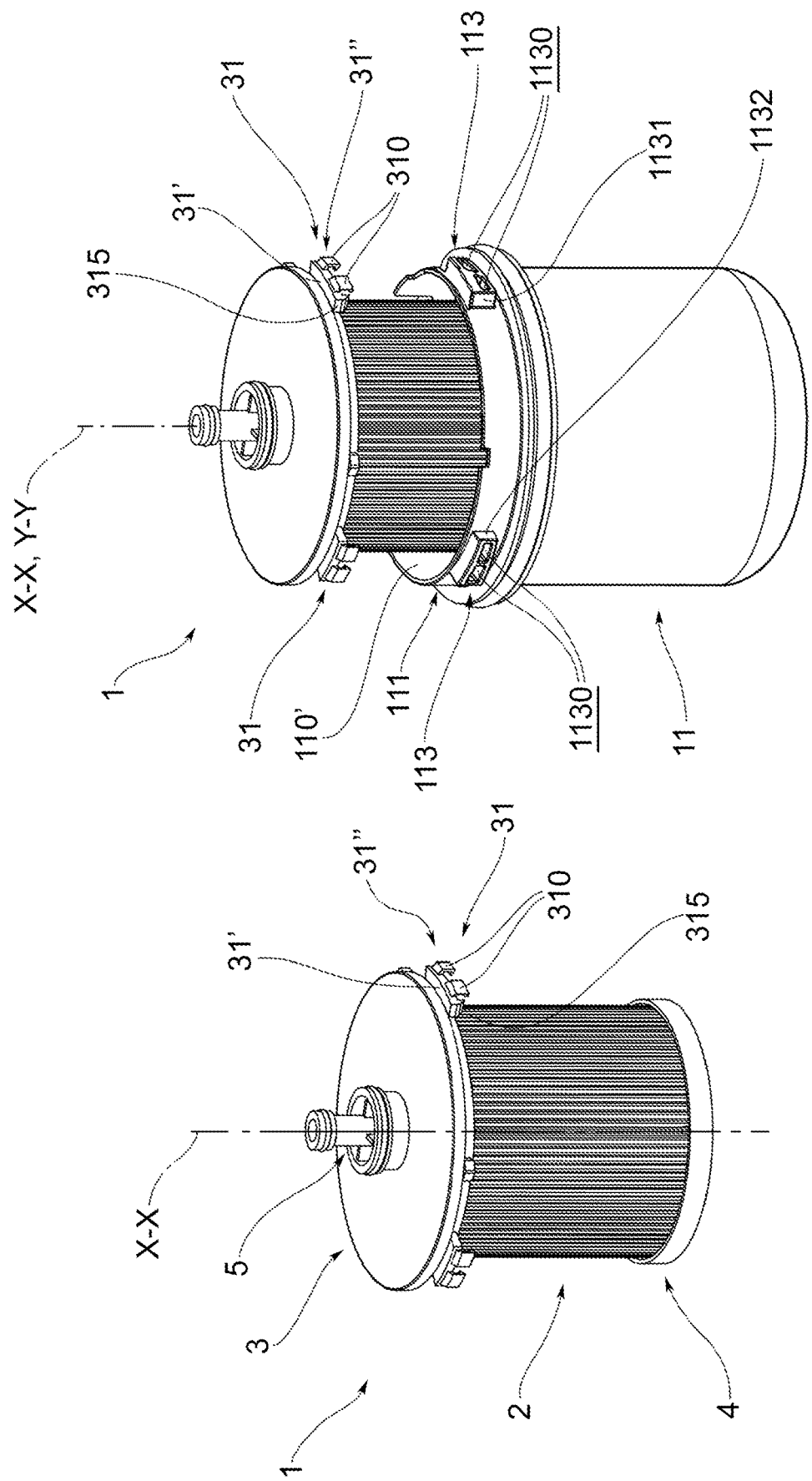
FIG. 1 shows a filter cartridge of a fluid filtration assembly according to the present invention, according to a preferred embodiment.
Figure 2:
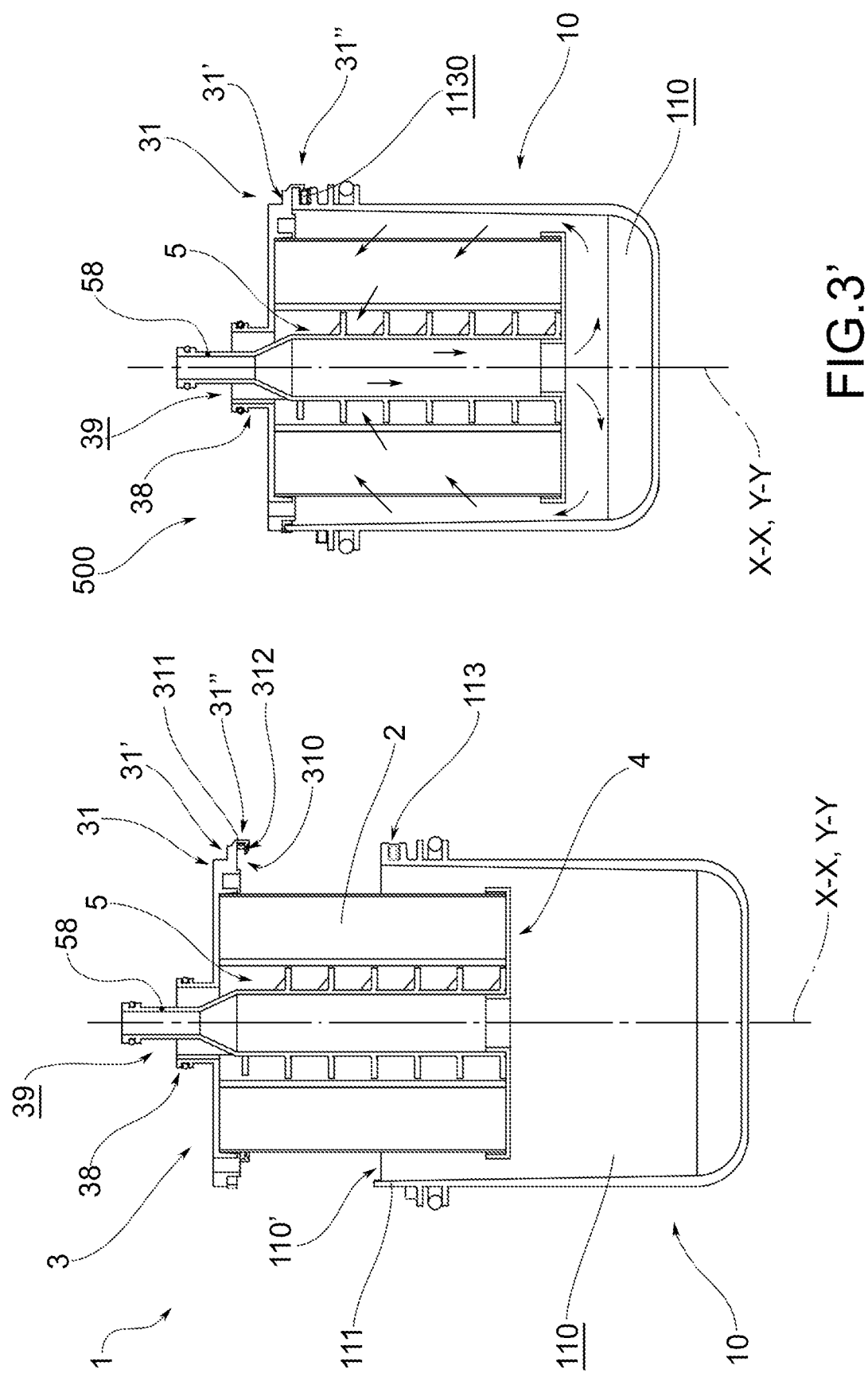
Figure 3:
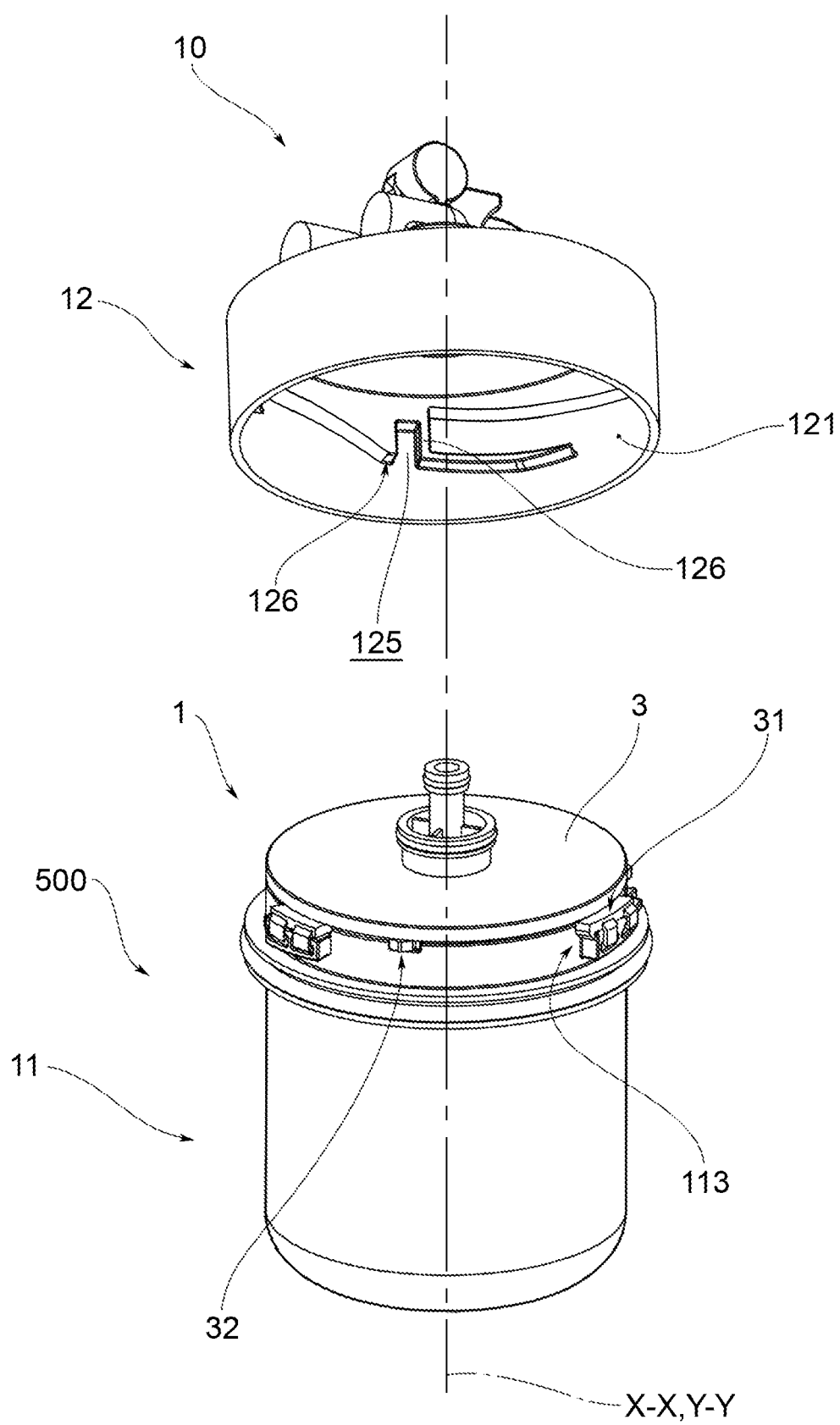
Figure 5:
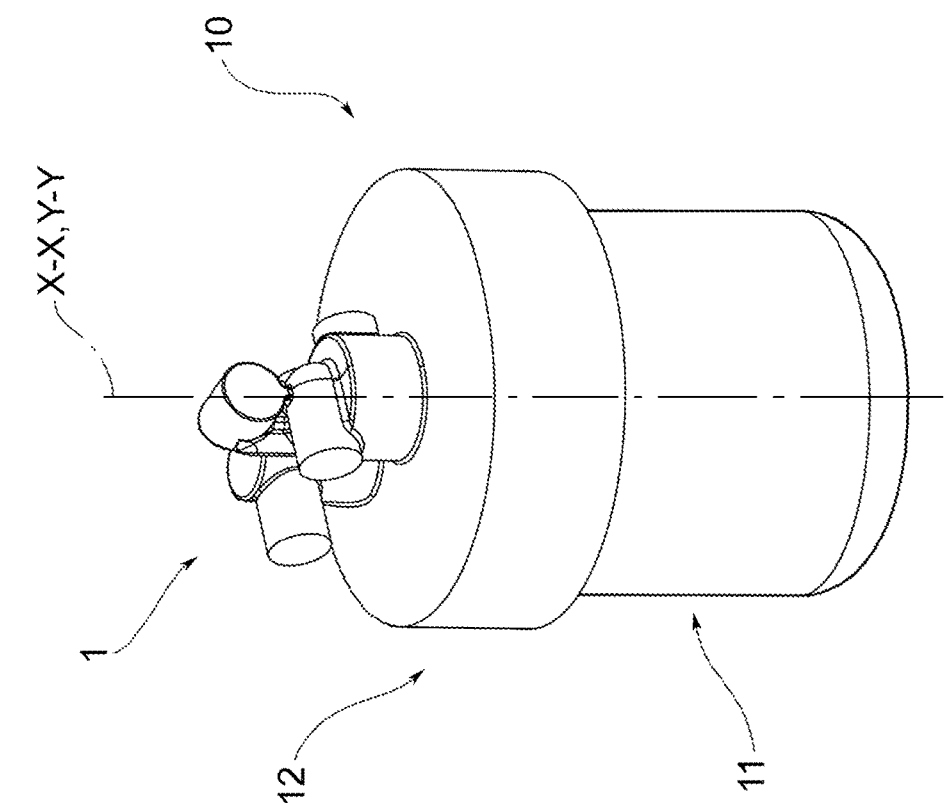
Figure 4:
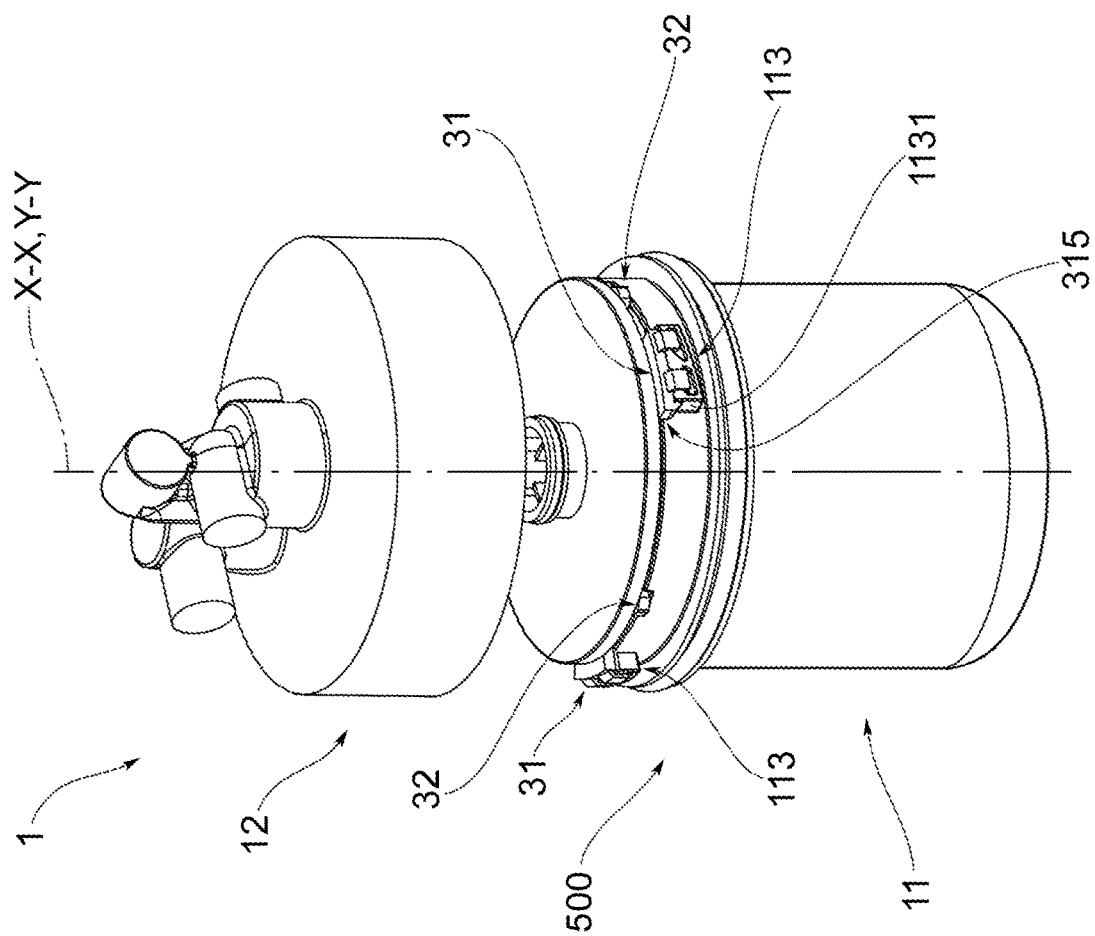
Figure 7:
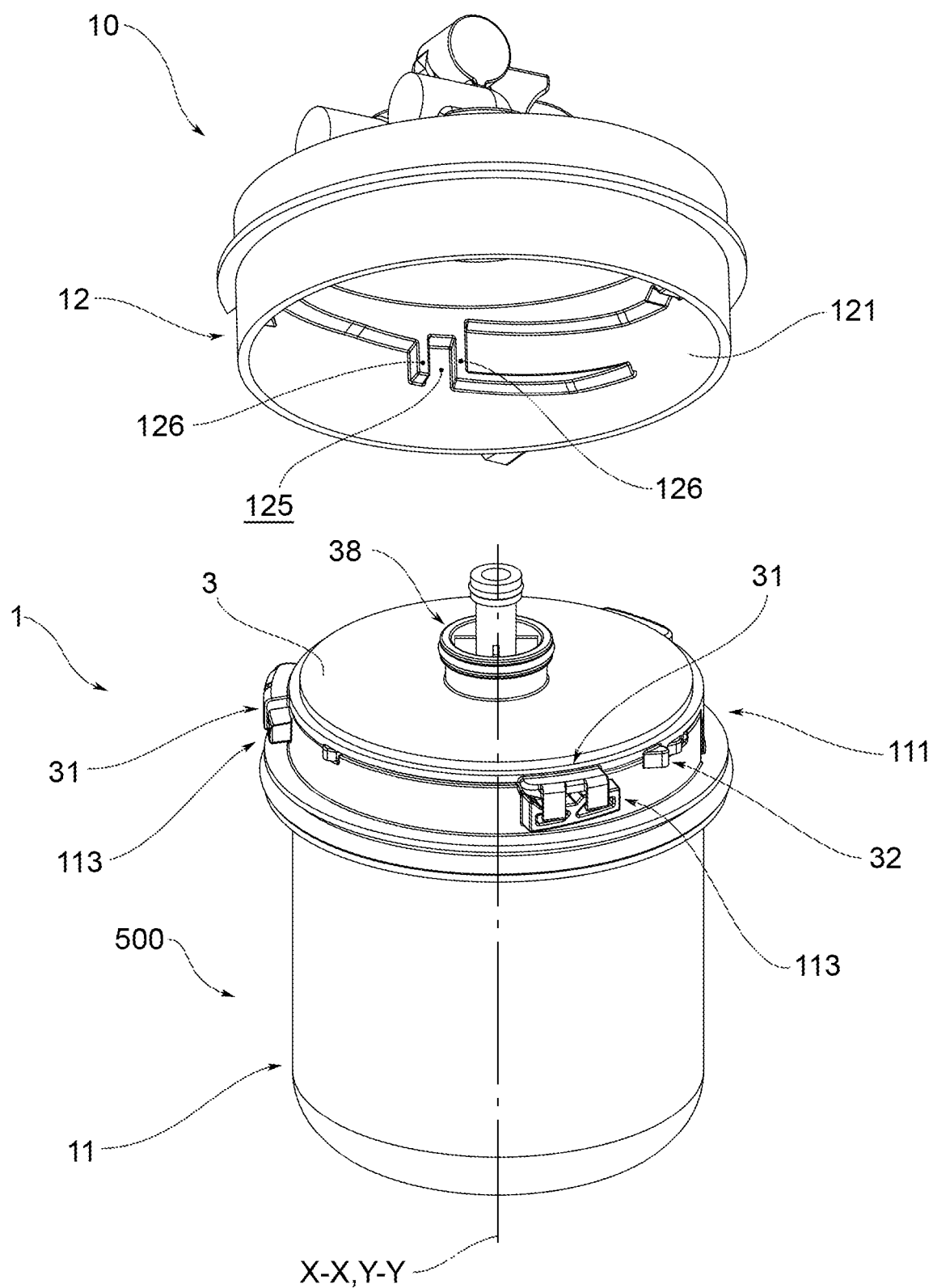
Figure 8:
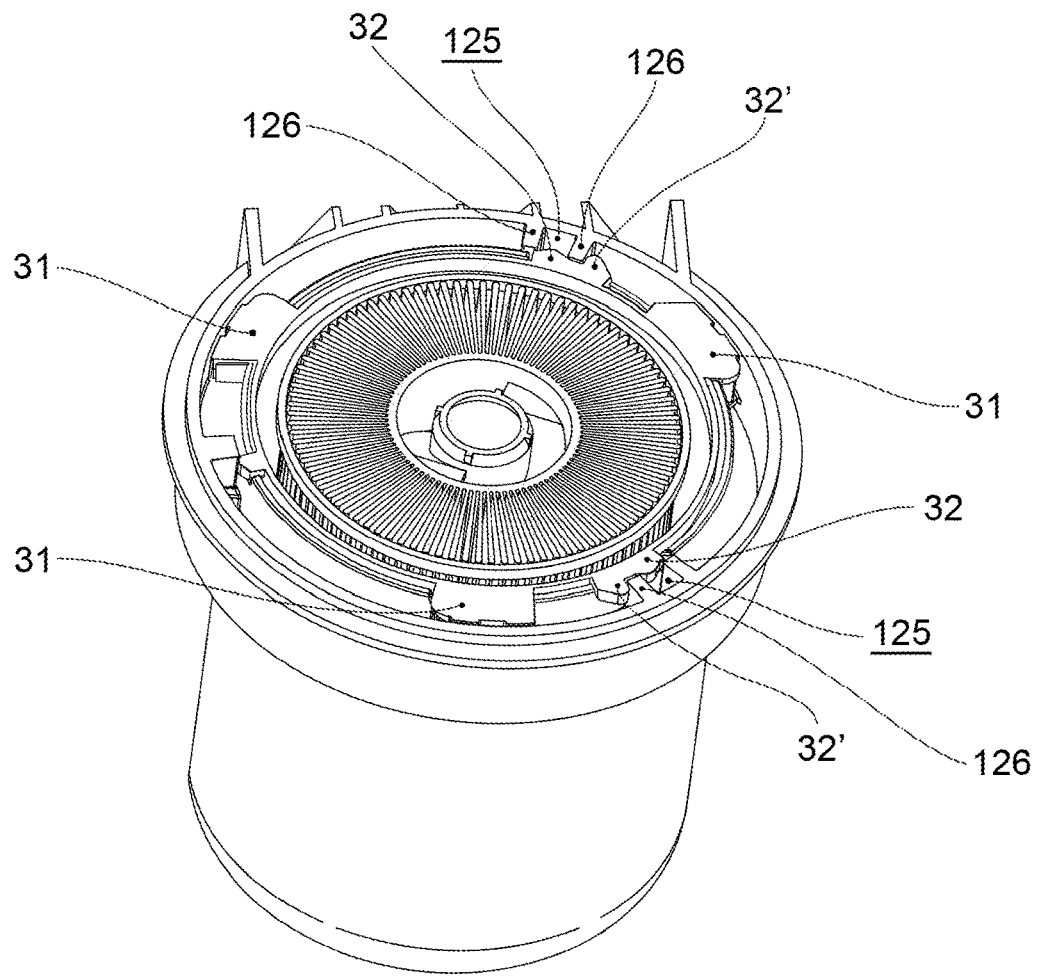
Figure 8:
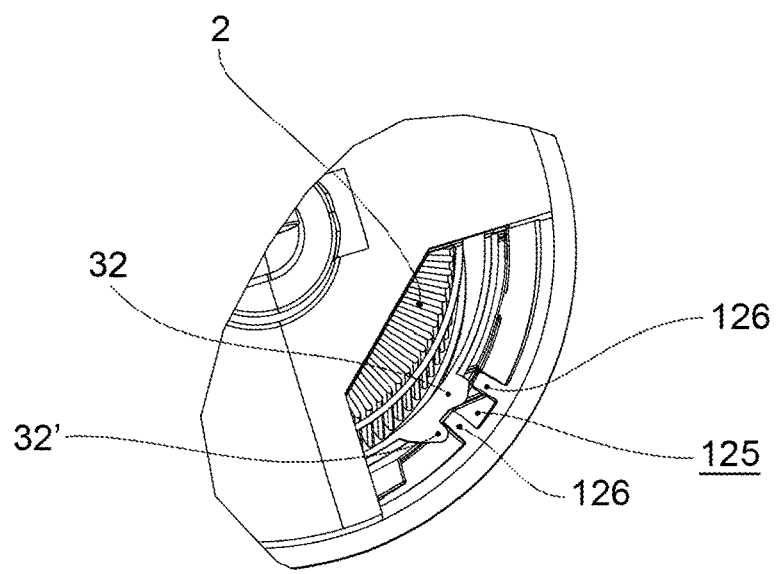
Figure 9:
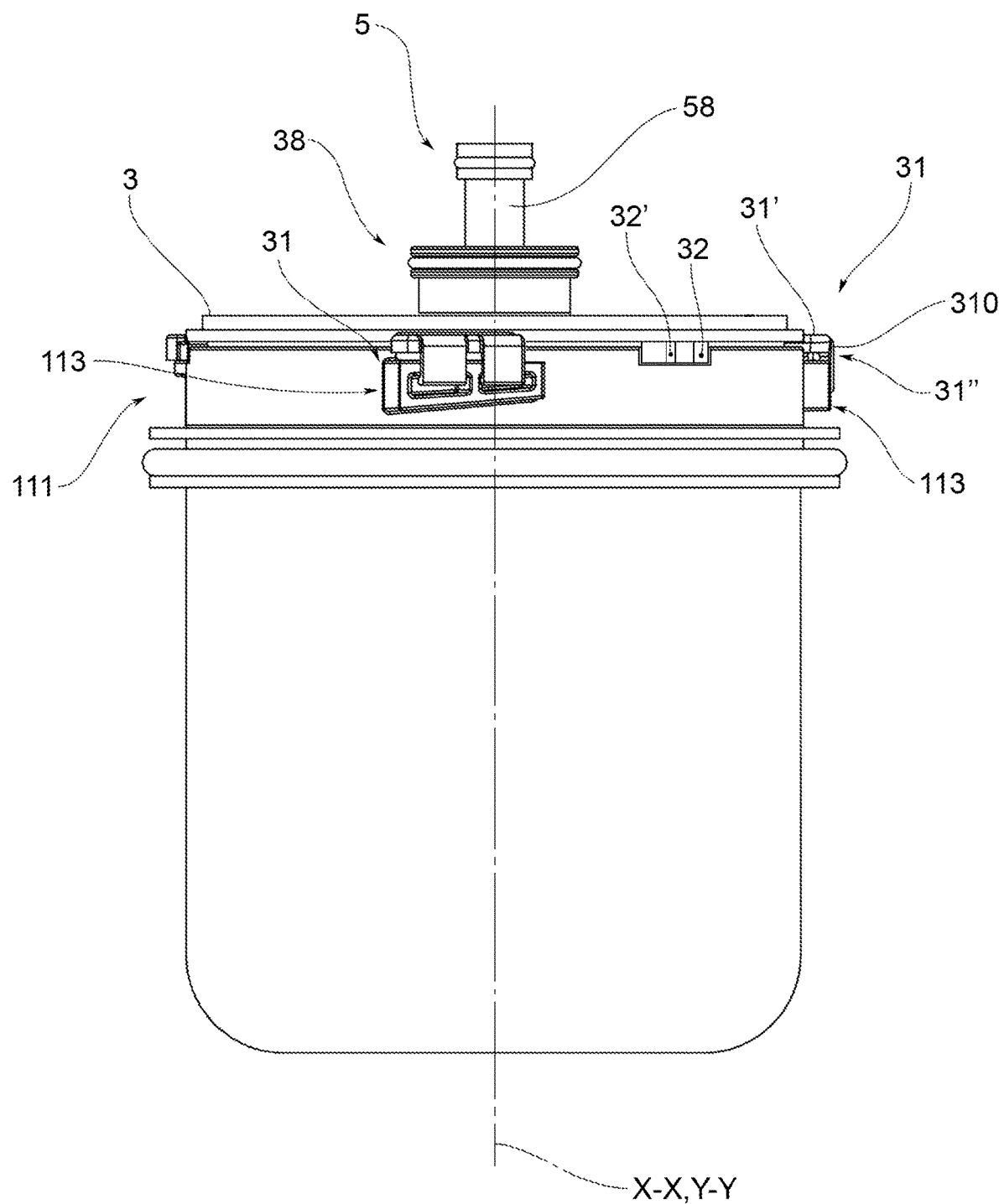

figures from 2 to 5 show some assembly steps of a fluid filtration assembly comprising the filter cartridge shown in FIG. 1, according to the present invention;

FIGS. 2' and 3' show two longitudinal cross-sections of the components shown in FIGS. 2 and 3;

FIGS. 6a and 6b show some transverse cross-sections of the fluid filtration assembly, respectively in an intermediate assembly configuration and in an assembled configuration;

FIGS. 6' and 6" show two enlargements of the fluid filtration assembly in an assembled configuration respectively in two transverse cross-sections on two different axial planes;

FIG. 7 shows a fluid filtration assembly comprising the filter cartridge according to the present invention, according to an embodiment variant, wherein said filtration assembly is shown in an assembly phase analogous to that shown in FIG. 3;

FIG. 8 shows a transversal cross-section of the fluid filtration assembly as in FIG. 7 in an assembled configuration, substantially analogous to that shown in FIG. 6b;

FIG. 8' is an enlargement of the fluid filtration assembly as in FIG. 7 in an assembled configuration, substantially analogous to that shown in FIG. 6';

FIG. 9 shows a side view of a fluid filtration assembly, i.e. comprising the filter cartridge as in FIGS. 7, 8 and 8' inserted in a bowl body, according to the present invention.

DETAILED DESCRIPTION

In the appended drawings, reference numeral 1 denotes a filter cartridge according to the present invention, while reference numeral 10 denotes a fluid filtration assembly comprising said filter cartridge 1 in turn according to the present invention.

According to the present invention, the fluid filtration assembly 10, which the filter cartridge 1 is suitable to form part of, extends along and around a main axis Y-Y.

The filtration assembly 10 comprises a bowl body 11 and a head body 12 suitable to reciprocally engage with each other.

In particular, the bowl body 11 and the head body 12 respectively comprise, circumferentially, a first collar 111 (or inner collar) and a second collar 121 (or outer collar) specially shaped to engage with each other. In other words, the first collar 111 is radially closer to the main axis Y-Y than the second collar 121. In other words again, in an assembled configuration, the second collar 121 surrounds the first collar 111.

Preferably, the first collar 111 and the second collar 121 have a substantially annular shape. According to said preferred embodiment, the first collar 111 and the second collar 121 are concentric having their centre lying on the main axis Y-Y.

According to a preferred embodiment, the first collar 111 and the second collar 121 are suitable to implement, by means of an action of roto-translation, the engagement of the bowl body 11 and the head body 12.

Preferably, the first collar 111 and the second collar 121 comprise an engagement system, such as a bayonet or screw system, made on the first collar 111 and on the second collar 121 (respectively on the walls facing each other). In other words, the respective "complementary" components of the engagement system (depending on the chosen embodiment) are on the first collar 111 and on the second collar 121.

For example, in a preferred embodiment, the engagement system is of the type with a bayonet fastening comprising:
a fixed element extending radially on the outside of the first collar 111; and
an engagement element extending radially on the inner side of the second collar 121.

Preferably, the fixed element has a polygonal shape, while the engagement element is suitable to engage the fixed element by means of a roto-translation. In other words, in this embodiment, the engagement element is suitable to engage and house the fixed element inside it.

Or again, in a preferred embodiment in which the engagement system is of the screw type, on the outside of the first collar 111 there is a first thread, while on the inside of the second collar 121 there is a second thread complementary to the first thread.

According to the present invention, regardless of the type of engagement system between the bowl body 11 and head body 12, the head body 12 and in particular the second collar 121, comprises at least one slot 125 facing inwards.

Said slot 125 extends parallel to the main axis Y-Y and is laterally defined by slot edges 126 having an axial extension. Preferably, said slot edges 126 extend parallel to each other. The purpose and function of said slots 125 and respective slot edges 126 is fully described below, and shown in the drawings provided by way of example According to a preferred embodiment, the bowl body has a filtration chamber 110 accessible through an access mouth 110' peripherally delimited by the first collar 111. In said filtration chamber 110 the filter cartridge 1 is at least partly housed.

According to a preferred embodiment, the head body 12 is suitable to be fluidically connected to the fuel circulation circuit and is suitable to be fluidically connected to the bowl body 11, preferably through the filter cartridge 1.

The filter cartridge 1 is suitable to be housed at least partially in the bowl body 11, in particular to be housed at least partly in the filtration chamber 110. The engagement methods of the bowl body 11 and head body 12 do not provide for any variation from the above description in a configuration with the filter cartridge 1 inserted. In other words, the presence of the cartridge 1 does not change the method of reciprocal engagement of the engagement system provided for between the bowl body 11 and the head body 12.

According to the present invention, in fact, the filter cartridge 1 comprises a filter medium 2 suitable to be housed in the filtration chamber 110.

Preferably, the filter medium 2 is of the tubular type, traversable by the fluid in the radial direction from the outside to the inside.

Preferably, the filter medium 2 is of the type comprising a pleated body. Preferably, the pleated body is a pleated filter medium.

In addition, the filter cartridge 1 comprises an end plate 3 positioned at an axial end of the filter medium 2. Preferably, said end plate has at least one opening 39 defined circumferentially by an annular mouth 38 through which the fluid to be filtered and filtered fluid flows in input and/or output. According to a preferred embodiment, said opening 39 lies centrally at the end plate 3 centred on the cartridge axis X-X.

Preferably, the filter cartridge 1 also comprises a bottom plate 4 placed at the end opposite the end plate 3.

According to a preferred embodiment, the filter cartridge 1 also comprises a tubular element 5 which extends along the cartridge axis X-X inside the filter medium 2 from the bottom plate 4 as far as the end plate 3. Preferably said tubular element 5 extends through the opening 39 with an inlet spout 58.

In other words, the end plate 3, the bottom plate 4 and the tubular element 5 identify the areas through which the dirty fluid and the clean fluid, before and after passing through the filter, flow. By way of example, the appended FIG. 3' shows the flow of liquid through the filter cartridge 1 according to a preferred embodiment described.

According to the present invention, the end plate 3 is specifically suitable to engage the first collar 111. In particular, the end plate 3 is suitable to close the access mouth 110' in such a way that the fluid flows only into the openings 39 provided on the end plate 3. In other words, the fluid flows in input through the inlet spout 58 and in output through the opening 39.

In particular, in fact, the end plate 3 comprises an active blocking member 31 suitable to block the filter cartridge 1 to the bowl body 11.

Said active blocking member 31 comprises at least one blocking tooth 310 suitable to snap-engage the bowl body 11 during the insertion in the axial direction in said bowl body 11 of the filter cartridge 1.

In other words, by means of the active blocking member 31, the filter cartridge 1 is fixed to the bowl body 11 in such a manner as to constitute a single filtration group 500.

According to a preferred embodiment, the active blocking member 31 comprises a first portion 31' which extends in the radial direction from the end plate 3 (radial with respect to the cartridge axis X-X) and a second portion 31" which extends in an axial direction (i.e. parallel to the cartridge axis X-X). Preferably, on said second portion 31" the at least one blocking tooth 310 is made proving elastically yielding in the radial direction.

That is to say that the active blocking element 31 is substantially an L-shaped element.

According to a preferred embodiment, the active blocking member 31 comprises at least one blocking tooth having a stem 311 and an attachment portion 312 or tooth protruding from said stem 311. Preferably therefore the at least one blocking tooth 310 comprises a stem 311 which extends from the end plate 3 in an axial direction, substantially parallel to the axis X-X, and an attachment portion 312 which extends from the axial end of the stem 311 in a radial direction inwards, i.e. transverse to the axis X-X. Preferably the attachment portion 312 defines an undercut with the stem to allow the attachment of the active blocking member 31 to the respective passive blocking member 113.

According to a preferred embodiment, the active blocking member 31 comprises a plurality of blocking teeth 310.

Specifically, the active blocking element 31 is suitable to cooperate with a respective passive blocking member 113 made on the bowl body 11, in particular on the first collar 111 (preferably on the outer wall of the first collar 111). Wherein said passive blocking member 113 extends in a radial direction outwards (in the radial direction with respect to the cartridge axis Y-Y) and also for a circumferential portion (in a circumferential direction relative to the cartridge axis (Y-Y).

In other words, said passive blocking member 113 forms an abutment for the active blocking member 31 on which the latter is suitable to operate performing the blocking action.

Preferably, the passive blocking element 113 has at least one blocking cavity 1130 which is snap-engageable by the at least one blocking tooth 310.

Preferably, the passive blocking member 113 comprises two blocking cavities 1130.

According to a preferred embodiment, said attachment portion 312 of the blocking member 310 comprises in an axial direction an upper portion facing towards the lower surface of the end plate 3 and a lower portion facing towards the bottom plate 4. Preferably, said lower portion has a bevelled and/or inclined profile. Said bevelled and/or inclined portion facilitates the engagement of the blocking tooth 310 in the relative blocking cavity 1130 in the axial engagement action. Said bevelled profile of the attachment portion 312, in fact determines the elastic yielding radially outwards, of the stem 311 during the reciprocal approaching of the filter cartridge 1 and bowl body 11. Upon reaching the attachment position the blocking member 310 elastically recovers its position allowing the insertion of the attachment portion 312 in the respective blocking cavity 1130.

In addition, according to a preferred embodiment, the passive blocking element 113 extends between a first circumferential end 1131 and a second circumferential end 1132 circumferentially spaced from one another and having an axial extension. According to said preferred embodiment, the active blocking member 31 comprises at least one abutment tooth 315 suitable to engage the first circumferential end 1131 or the second circumferential end 1132 to axially align the active blocking member 31 with the passive blocking member 113.

According to the description it is evident that the active blocking member 31 and passive blocking member 113 are specially shaped to cooperate with one another.

For example, in a preferred embodiment, the filter cartridge 1 comprises a plurality of active blocking members 31, preferably three active blocking members 31. Preferably, the number of active blocking members 31 corresponds to the number of passive blocking members 113.

According to this preferred embodiment, said active blocking members 31 are angularly spaced in an irregular manner, in such a way that they are not angularly equidistant (in the same manner therefore so are the passive blocking members 113).

According to the present invention, moreover, the end plate 3 also comprises at least one anti-rotation element 32 which extends in a radial direction from the end plate 3.

Preferably, said anti-rotation element 32 is suitable to engage circumferentially the head body 12 in such a manner as to oppose the mutual rotation between the filtration group 500 and the head body 12.

According to the present invention, in particular, the anti-rotation element 32 is suitable to be housed in the slot 125 of the second collar 121. Preferably, the anti-rotation element 32 is therefore suitable to perform on the edges 126 which laterally delimit said slot 125 an action of circumferential abutment which opposes the mutual rotation between the filtration group 500 and the head body 12.

According to the present invention, in particular, the anti-rotation element 32 comprises an end portion and/or tip suitable to be housed in the slot 125 of the second collar 121. Preferably said tip portion interacts with the edges 126 delimiting the slot 125 to perform an end stroke action upon passing one of said edges. Preferably, the end stop action is obtained upon passing the edge 126 in the vicinity of the active blocking member 31.

According to a preferred embodiment, the anti-rotation element 32 is suitable to interfere with the slot 125 and in particular with the slot walls 126. That is to say that the anti-rotation element 32 geometrically couples with the slot 125. Preferably, the anti-rotation element 32 and the slot walls 126 mutually engage with a shaped coupling.

In yet other words, the anti-rotation element 32 performs an end stop action.

According to a preferred embodiment, the anti-rotation element 32 extends integrally from the end plate 3.

Preferably, the anti-rotation element 32 extends in a radial direction in tapered shape.

Preferably, in a further preferred embodiment, the anti-rotation element 32 is an element made in the shape of a tab hinged to the end plate 3 with its axis of rotation oriented parallel to the cartridge axis X-X. According to said preferred embodiment, the anti-rotation element 32 is elastically yielding upon engagement of the head body 12, in particular it is elastically yielding in a radial direction.

In accordance with said tapered shape of its distal end, the anti-rotation element 32 facilitates, during the relative rotation between the filtration group 500 and the head body 12, the engagement of the anti-rotation element 32 with the edges 126 of the slot 125. This way the housing of the anti-rotation element 32 is facilitated, to facilitate its housing in said slot 125.

According to a preferred embodiment, said anti-rotation element 32 comprises a surface for clockwise sliding 321 and a surface for anti-clockwise sliding 322. Preferably, the two surfaces are thus suitable to engage the respective edges 126.

Preferably, such surfaces for clockwise sliding 321 and for anti-clockwise sliding 322 have the same inclination with respect to the main cartridge axis.

According to a preferred embodiment, the inclination of the surface for clockwise sliding 321 is different from that of the surface for anti-clockwise sliding 322. Depending on the mutual inclination it is possible to adjust the clamping force for opening and closing the filtration assembly depending on the specific application. For example the closing force may be less than the opening force, minimising the risk of unintentional opening of the filtration assembly and facilitating the closing of the assembly.

According to a preferred embodiment, moreover, the end plate 3 comprises a plurality of anti-rotation elements 32, preferably as a function of the number of slots 125 present on the respective head body 12.

According to a preferred embodiment, three anti-rotation elements 32 are provided suitable to be housed in three specially shaped slots 125.

According to a preferred embodiment, the anti-rotation elements 32 have different shapes from each other, depending on the shape and dimensions of the slots which they must cooperate with.

According to the present invention, it is important to note that the active blocking member 31 and the anti-rotation element 32 are two distinct elements, respectively angularly spaced from one another.

According to a preferred embodiment, the active blocking member 31 is specially shaped to operate in an axial direction and in a radial direction; instead, the anti-rotation element 32 is specially shaped to operate in a circumferential direction, either clockwise or anti-clockwise.

According to a preferred embodiment, moreover, as shown for example in FIGS. 7 to 9, the anti-rotation element 32 also comprises a safety portion 32' which projects radially more than the height of the anti-rotation element 32 so as to prevent it being passed: specifically in fact, the safety portion 32' if engaged by an edge 126 prevents a further rotation of the head body 12 on the filtration assembly 500.

That is to say that the safety portion 32' is suitable to prevent a continued rotary action in a given rotary direction of the head body 12 on the filtration assembly 500 from causing the exit of the anti-rotation element from the slot 125. In yet other words, the safety portion 32' is suitable to abut on the edge 126 once the anti-rotation element 32 is housed in the slot 125; preferably the safety portion 32' is suitable to abut on the outer side of the edge 126.

The present invention also relates to an assembly method of a fluid filtration assembly 10 having the characteristics described above.

Said assembly method comprises the steps of:
axially inserting the filter cartridge 1 in the bowl body 11 until the at least one blocking tooth 310 of the filter cartridge 1 snap-locks to the bowl body 11 obtaining a filtration group 500;
performing the action of mutual roto-translation between the filtration group 500 and the head body 11, in such a manner that the head body 12 engages with the bowl body 11 and the at least one anti-rotation element 32 is housed in the respective slot 125.

In other words, the assembly method distinguishes between two clearly-defined separate operations: a first action in the axial direction between the bowl body 11 and filter cartridge, in which the cartridge axis X-X aligns with the main axis Y-Y and performs the action of axial approach until the active blocking member engages the passive blocking member; a second rotary action between the filtration group 500 and the head body 12 which involves the mutual engagement of the bowl body 11 and the head body 12, wherein said action is performed by means of the engagement system provided on the respective collars, and ends when the anti-rotation element 32 is housed in the respective slot 125.

Innovatively, the filter cartridge and fluid filtration assembly described above fully achieve the purpose of the present invention overcoming the drawbacks typical of the prior art. Innovatively, the assembly method of the filtration assembly fully achieve the purpose of the present invention overcoming the drawbacks typical of the prior art.

Advantageously, in fact, the maintenance operations of the filtration assembly are simplified: advantageously the opening of the filtration assembly is obtained by the mere reciprocal rotation of the filtration assembly and head body; overcame the action of the anti-rotation element by mere rotation, the assembly is open, and the cartridge can thus be accessed.

Advantageously the filter cartridge has specific components (the blocking member) operating exclusively with the bowl body and specific components (the anti-rotation element) operating exclusively with the head body. Advantageously, the former are suitable to operate in an axial direction and in a radial direction, while the latter are suitable to operate in a clockwise or anti-clockwise direction.

Moreover, advantageously, the anti-rotation element is suitable to provide an abutment suitable to give a feedback to the operator in the assembly and disassembly operations.

Advantageously, the plurality of blocking members and/or the plurality of anti-rotation elements makes it possible to keep the system safe for example in the case of breakage of one of said components.

Innovatively, it is evident that the assembly method (and conversely, the disassembly method) provides for simple, intuitive operations, repeatable over time.

It is clear that a person skilled in the art may make modifications to the filter cartridge or production method described above so as to satisfy contingent requirements, all contained within the scope of protection as defined by the following claims.

LIST OF REFERENCE NUMBERS

1 filter cartridge
X-X cartridge axis
2 filtering medium
3 end plate
31 active blocking member
31' first portion
31" second portion
310 blocking tooth
311 stem
312 attachment portion
315 abutment tooth
32 anti-rotation element
321 surface for clockwise sliding
322 surface for anti-clockwise sliding
32' safety portion
38 annular mouth
39 inlet opening
4 bottom plate
5 tubular element
59 inlet spout
10 filtration assembly
Y-Y main axis
11 bowl body
110 filtration chamber
110' access mouth
111 first collar
113 passive blocking member
1130 blocking cavity
1131 first circumferential end
1132 second circumferential end
12 head body
121 second collar
125 slot
126 edges
500 filtration group

The invention claimed is:

1. A fluid filtration assembly extends along a main axis and comprises a bowl body and a head body, wherein the bowl body and the head body respectively comprise, circumferentially, a first collar and a second collar shaped to mutually engage by a reciprocal action of roto-translation;
wherein said bowl body has a filtration chamber accessible through an access mouth peripherally delimited by the first collar;
wherein the head body has in the second collar at least one slot facing inwards and parallel to the main axis laterally delimited by slot edges having an axial extension;
wherein the first collar of the bowl body comprises a passive blocking member extending radially outward and forming a radially outward facing cavity;
wherein the fluid filtration assembly further comprises a filter cartridge extending around a cartridge axis and comprises:
i) a filter medium housed in the filtration chamber;
ii) an end plate located at an axial end of the filter medium and engaging the first collar comprising:
an active blocking member blocking the filter cartridge to the bowl body to comprise a single filtration group, wherein the active blocking member comprises at least one blocking tooth to snap-engage the passive blocking member outward facing cavity during insertion in an axial direction of the filter cartridge into the bowl body, said blocking tooth comprising a stem extending from the end plate in an axial direction toward the bowl body substantially parallel to the cartridge axis, and an attachment portion extending from an axial end of the stem in a radially inward direction transverse to the cartridge axis, the attachment portion defining an undercut with the stem configured to attach the active blocking member to the passive blocking member;
at least one anti-rotation element extending in a radial direction from the end plate to be housed in the slot of the second collar by performing on the slot edges a circumferential abutment action opposing mutual rotation between the filtration group and the head body;

wherein the anti-rotation element integrally extends from the end plate, extending in a radial direction in a tapered shape to facilitate housing of the anti-rotation element in said slot, during relative rotation between the filtration group and the head body;

wherein the anti-rotation element comprises a surface for clockwise sliding and a surface for anti-clockwise sliding configured to engage said slot edges;

wherein said surface for clockwise sliding has a first inclination relative to the cartridge axis, and said surface for anti-clockwise sliding has a second inclination relative to the cartridge axis, said second inclination being different from said first inclination.

2. The fluid filtration assembly according to claim 1, wherein the active blocking member comprises a first portion which extends in a radial direction from the end plate and a second portion which extends in the axial direction, wherein on said second portion the at least one blocking tooth is elastically yielding in a radial direction.

3. The fluid filtration assembly according to claim 1, wherein the passive blocking member extends in a radial outward direction and extends for a circumferential portion, wherein said passive blocking member forms an abutment for the active blocking member and wherein the passive blocking member outward facing cavity is snap-engageable by the at least one blocking tooth.

4. The fluid filtration assembly according to claim 3, wherein the passive blocking member comprises two blocking cavities and the active blocking member comprises two blocking teeth for engaging said two blocking cavities.

5. The fluid filtration assembly according to claim 3, wherein the passive blocking member extends between a first circumferential end and a second circumferential end circumferentially spaced and having an axial extension, wherein the active blocking member comprises at least one abutment tooth for engaging the first circumferential end or the second circumferential end to axially align the active blocking member with the passive blocking member.

6. The fluid filtration assembly according to claim 1, wherein the bowl body on the first collar comprises a plurality of passive blocking members and the filter cartridge comprises a plurality of active blocking members.

7. The fluid filtration assembly according to claim 6, wherein said active blocking members are angularly spaced in an irregular manner, so that the active blocking members are angularly variably spaced.

8. The fluid filtration assembly according to claim 1, wherein the head body comprises a plurality of slots and the filter cartridge comprises a plurality of anti-rotation elements.

9. The fluid filtration assembly according to claim 1, wherein the active blocking member and the anti-rotation element are two distinct elements, respectively angularly spaced from one another.

10. The fluid filtration assembly according to claim 6, wherein said active blocking members are angularly spaced in an irregular manner, so that the active blocking members are angularly variably spaced, wherein plurality of passive blocking members angularly spaced in an irregular manner, so that the passive blocking members are angularly variably spaced.

11. The fluid filtration assembly according to claim 1, wherein the slot made in the second collar of the head body is defined by the slot edges, angularly spaced from each other, which extend in a radial direction from an inner side of the second collar towards a center of the head body.

12. The fluid filtration assembly according to claim 1, wherein the first collar in an outer side and the second collar in an inner side comprise complementary reciprocal engagement devices, which with an action of mutual roto-translation perform mutual engagement between the bowl body and the head body.

13. A method of assembly of the fluid filtration assembly according to claim 1, comprising the steps of:

axially inserting the filter cartridge in the bowl body until the at least one blocking tooth of the filter cartridge snap-locks to the bowl body obtaining the filtration group;

performing mutual roto-translation between the filtration group and the head body so that the head body engages with the bowl body and the at least one anti-rotation element is housed in the at least one slot.

14. The fluid filtration assembly according to claim 1, comprising a bayonet or screw system made on said first collar and said second collar.

15. The fluid filtration assembly according to claim 6, wherein the plurality of active blocking members comprises three active blocking members.

16. The fluid filtration assembly according to claim 8, wherein a quantity of the plurality of anti-rotation elements amount corresponds to the quantity of slots.

17. The fluid filtration assembly according to claim 12, comprising a bayonet or screw system.

18. The fluid filtration assembly according to claim 1, wherein said first inclination is greater than said second inclination.

19. A fluid filtration assembly extends along a main axis and comprises a bowl body and a head body, wherein the bowl body and the head body respectively comprise, circumferentially, a first collar and a second collar shaped to mutually engage by a reciprocal action of roto-translation;

wherein said bowl body has a filtration chamber accessible through an access mouth peripherally delimited by the first collar;

wherein the head body has in the second collar at least one slot facing inwards and parallel to the main axis laterally delimited by slot edges having an axial extension;

wherein the first collar of the bowl body comprises a passive blocking member extending radially outward and forming a radially outward facing cavity;

wherein the fluid filtration assembly further comprises a filter cartridge extending around a cartridge axis and comprises:

i) a filter medium housed in the filtration chamber;

ii) an end plate located at an axial end of the filter medium and engaging the first collar comprising:

an active blocking member blocking the filter cartridge to the bowl body to comprise a single filtration group, wherein the active blocking member comprises at least one blocking tooth to snap-engage the passive blocking member outward facing cavity during insertion in an axial direction of the filter cartridge into the bowl body, said blocking tooth comprising a stem extending from the end plate in an axial direction toward the bowl body substantially parallel to the cartridge axis, and an attachment portion extending from an axial end of the stem in a radially inward direction transverse to the cartridge axis, the attachment portion defining an undercut with the stem configured to attach the active blocking member to the passive blocking member;

at least one anti-rotation element extending in a radial direction from the end plate to be housed in the slot of the second collar by performing on the slot edges a circumferential abutment action opposing mutual rotation between the filtration group and the head body; and
a safety portion extending radially outward spaced circumferentially apart from the anti-rotation element and extending radially outward further than the anti-rotation element, the safety portion being configured to abut a corresponding one of the slot edges;
wherein the safety portion is configured to abut an outer side of the corresponding one of the slot edges.

* * * * *